United States Patent [19]

Visser

[11] 4,381,127

[45] Apr. 26, 1983

[54] SEALED BEARING

[75] Inventor: Teunis Visser, Sliedrecht, Netherlands

[73] Assignee: IHC Holland N.V., Papendrecht, Netherlands

[21] Appl. No.: 254,984

[22] Filed: Apr. 16, 1981

[30] Foreign Application Priority Data

Apr. 18, 1980 [NL] Netherlands .................. 8002280

[51] Int. Cl.³ ............................................. F16C 33/74
[52] U.S. Cl. .................................... 384/151; 384/286; 384/399; 384/400
[58] Field of Search ................... 308/36.1, 9, 238, 240, 308/122, 170; 277/3, 134

[56] References Cited

U.S. PATENT DOCUMENTS

| 1,510,804 | 10/1924 | Sherwood. | |
|---|---|---|---|
| 2,663,599 | 12/1953 | Mackay | 308/134.1 |
| 3,150,822 | 9/1964 | Dreyfus et al. | 277/134 |
| 3,302,988 | 2/1967 | Senter | 308/238 |
| 3,981,547 | 9/1976 | Perruzzi | 308/98 |
| 4,010,960 | 3/1977 | Martin | 277/3 |
| 4,194,745 | 3/1980 | McDougal | 277/134 |

FOREIGN PATENT DOCUMENTS 2142031 2/1973 Fed. Rep. of Germany.
1546372 1/1968 France.
6617168 6/1968 Netherlands.

Primary Examiner—Lenard A. Footland
Attorney, Agent, or Firm—Young & Thompson

[57] ABSTRACT

The invention relates to the combination of a radial bearing 4,5;38,39 and a seal 14,17,21; 42,45,46 which both make use of elastomeric bushings 6,7,17,42,45 having a smooth cylindrical surface supporting a shaft (1,36) provided with helical grooves 10,11,15,19,46 conveying the lubricating liquid said helical grooves conveying in the same or opposite directions, said combination of radial bearing and seal further can be combined with an axial bearing 40 having grooves in a disc 53 which rotates with the shaft (36) and which is in engagement with stationary discs 54,55 of elastomeric material.

8 Claims, 2 Drawing Figures

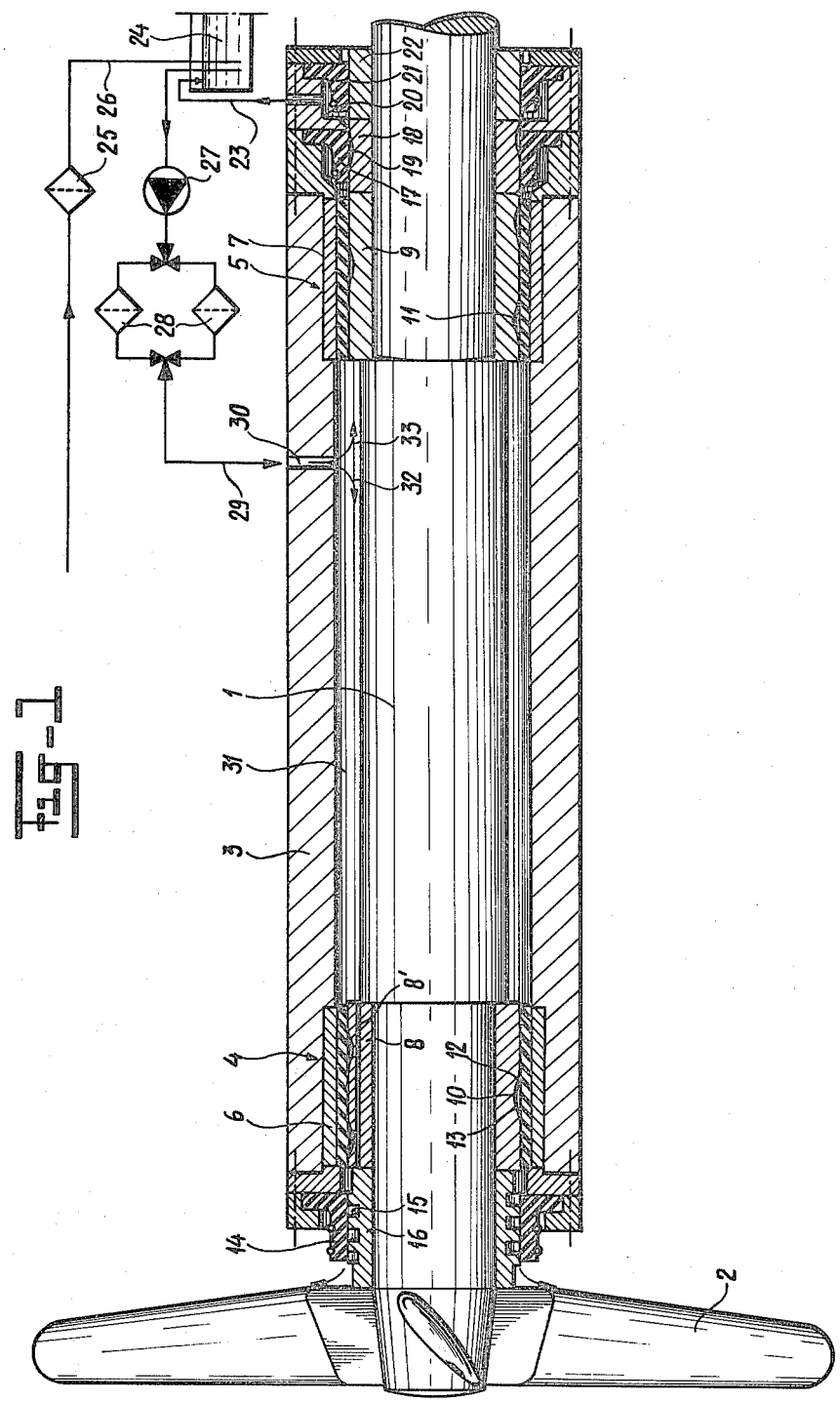

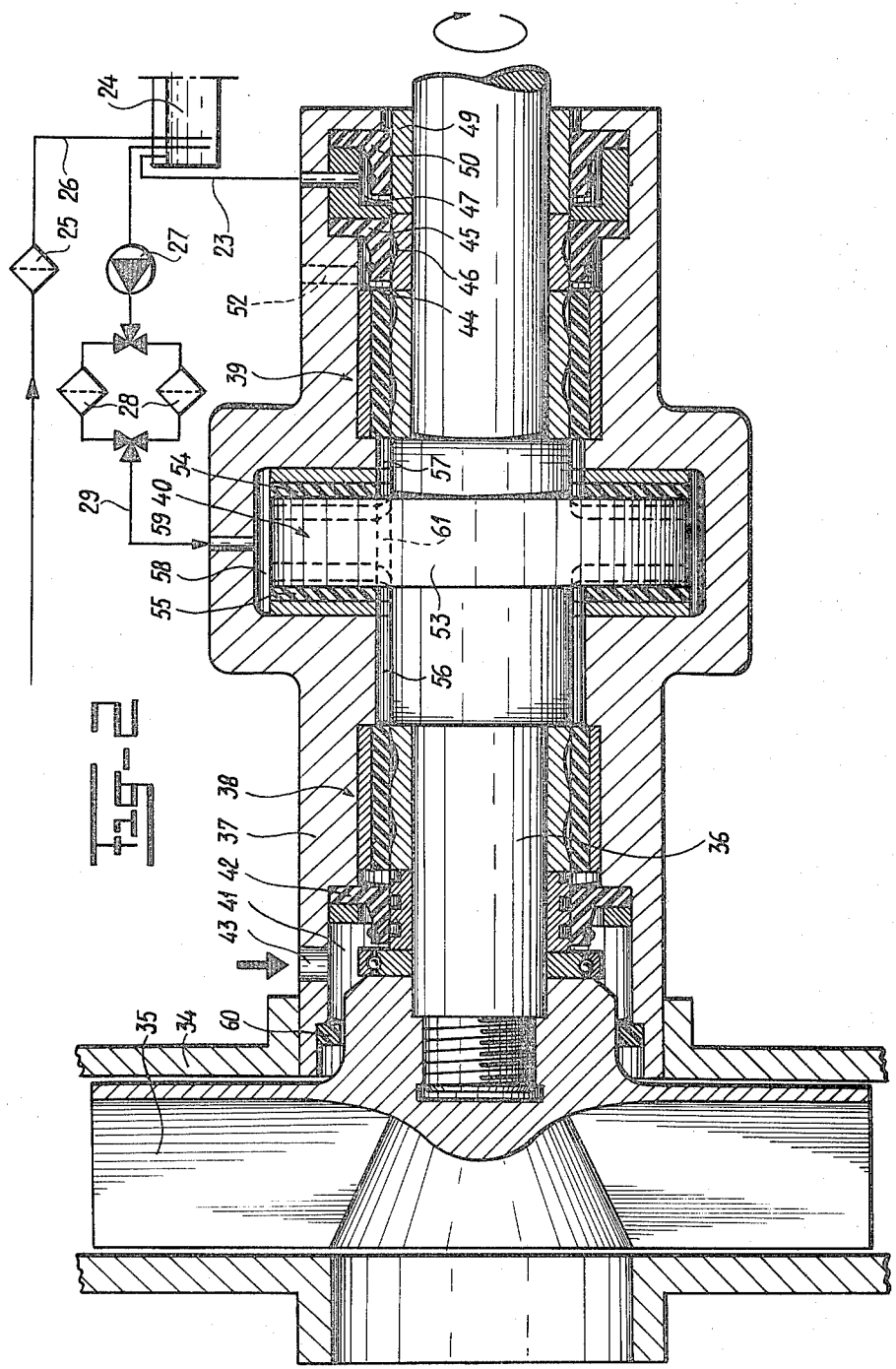

SEALED BEARING

The invention relates to a sealed bearing utilizing elastomeric materials such that at the location of the seal the shaft is provided with a helical groove cooperating with a stationary cylindrical elastomeric sealing lip having L-shaped cross section. The seal indicated above has been described in the non-prepublished older Dutch patent application No. 7811164 in which shaft seal the bearing may be a usual slide bearing or a roller bearing. In case of this seal a controlled discharge of liquid occurs by way of the seal whereby high pressure differentials may be released in a controlled manner and dirt may be carried away without causing wearing of the seal.

The object of the invention is to provide a simple and sturdy construction of a sealed bearing utilizing the sealing principle according to the older Dutch patent application No. 7811164 which bearing and seal have to be insensitive to the type of lubricant and to the operating conditions met. In particular a lubrication by means of water is considered thereby though other lubricants may be employed too as long as they do not attack the elastomer.

In accordance with the invention this object is achieved in that the radial bearing is comprised of a stationary elastomeric bush and that at the location of the bearing the shaft is provided with a helical groove the direction of conveyance of which is the same as or opposite to the direction of conveyance of the groove in the shaft at the location of the seal and the propulsive flank of which is at a very small angle with the axis of the shaft and with the tangent to the circumference of the shaft, said bearing being supplied with liquid lubricant. In accordance with the invention the shaft is thus not supported any longer by a metal slide bearing or by a roller bearing but contrary thereto by a smooth elastomeric bush cooperating with a helical groove in the shaft of such a shape that upon being loaded by the elastomeric surface of the bush this groove will form a very small wedge angle in which a fluid pressure is built up. One may speak of a hydrodynamic bearing in which the elastic properties of the elastomeric bush are utilized for the formation of the lubricating wedge.

The combination of bearing and seal may be such that the supply of fluid is by way of the seal or that the discharge of the bearing occurs by way of the seal. In the former case the liquid lubricant of the bearing is determined by the amount passed by the seal. In the latter case the bearing conveys liquid towards the seal where said liquid is discharged in a controlled manner. If necessary the pressure differential of the medium may also play a part therein.

Both at the bearing and the seal a good flushing will occur so that dirt or waste will be discharged continuously. Due to the conveying action of the bearing and the seal there will occur a proper cooling. When using water as the lubricating liquid the particularly favorable lubricating properties of the combination of water and the elastomer will likewise effectively be utilized.

The invention thus provides a sealed bearing which is strong and of simple construction, rather insensitive to centring faults, causes little friction losses, is insensitive to dirt, combines lubrication, cooling and flushing into a single system and dampens vibrations, while when using water in a water environment like in submerged devices the whole is of no environmental harm, because leakage of the lubricating liquid does not cause any problem whereas the lubricating liquid may moreover be obtained from the immediate surroundings.

According to the invention the shaft may—apart from the combination of seals together with a radial bearing—possess an axial bearing the stationary bearing parts of which are comprised of elastomeric discs having a smooth surface and the disc of which mounted on the shaft possesses in its surface or surfaces grooves running from the inside to the outside of which grooves at least one flank of which in the direction of rotation is at a small angle of inclination with the plane of the disc, said axial bearing being located in the flow of liquid to or from the radial bearing(s) and seal(s). This axial bearing thus utilizes the flow of liquid to or from the radial bearings.

By way of example of a bearing construction of a propeller shaft bearing, the bearing according to the invention may consist of two elastomeric radial bearings spaced apart from each other the directions of conveyance of which are the reverse in combination with axially consecutive elastomeric seals conveying in the same direction and succeeding the bearings in the direction of conveyance and with a supply of pressurized liquid to the shaft box at a location between said radial bearings. In such a bearing the lubricating liquid, such as sea water, supplied to the shaft box runs to the bearings and from there by way of the seals to the outside.

According to the invention the liquid discharged from at least one seal may be returned to the tank from which the bearing liquid is supplied to the shaft box. Accordingly the bearing liquid does not have to get lost but may at least partly be used again.

Between the tank and the shaft box there may be provided a pump and a filter for removing fines. This is of particular importance when sea water is used as the lubricating agent, said sea water entering the tank by way of a filter for removing coarse material from which tank the sea water is supplied to the shaft box by way of a filter for removing fines.

Such a bearing may include an axial bearing incorporated therein or a separate axial bearing of another or similar construction.

A compact construction, for instance of a pump bearing or a cutter bearing in which the pump may be a dredging pump, may in accordance with the invention be achieved in that such a bearing consists of two elastomeric radial bearings conveying in opposite directions while between said bearings an axial elastomeric bearing is arranged and the elastomeric seals are mounted outwards of the radial bearings and convey in the same direction as the radial bearing whereas the liquid is supplied at the location of the axial bearing. If abrasive material is present, such as at the dredging pump, the bearings and the seals will operate in the direction of conveyance, thus discharging the sand particles or inhibiting the same to reach said bearings or seals.

The invention will now be described with reference to the accompanying drawings, in which:

FIG. 1 diagrammatically shows in cross section a propeller shaft bearing according to the invention, and FIG. 2 diagrammatically shows a cross section of the bearing of a dredger suction pump.

FIG. 1 represents a propeller shaft 1 including a propeller 2 supported within a propeller shaft box 3.

At 4 and 5 there are provided elastomeric radial bearings consisting of a smooth cylindrical bush 6 and 7, respectively, mounted stationary within the propeller shaft box 3.

Bushes 8 and 9, respectively are mounted stationary on the propeller shaft 1, which bushes 8 and 9, respectively, are provided with a helical groove 10 and 11, respectively, the flanks 12 and 13, respectively of which running in opposite directions are at a very small angle of inclination with the axis of the shaft and of the plane of the bush 6, respectively and which in view of the pitch angle are also at a very slight angle with the tangent to the circular inner face of the bush. Such a bearing is suitable for both directions of rotation.

In view of the normal propulsive direction of rotation of the propeller 2 which when viewed from behind takes the right hand course the helical groove 10 in the bush 8 of the shaft 1 runs to the right and will consequently be conveying from the right to the left in FIG. 1.

At the bush 9 the helical groove runs to the left and will consequently be conveying from the left to the right.

To the left of the elastomeric bearing 4 there is provided a dirt arrestor consisting of an elastomeric bush 14 having a L-shaped cross section which cooperates with a helical groove 15 in a bush 16 mounted stationary on the shaft 1. The groove 15 conveys in the same direction as the groove 10 so that liquid arriving from the bearing 4 by way of the groove 15 will be discharged in a controlled manner whereby the penetration of dirt will be prevented at the location of the seal.

The bush 8 possesses a channel 8' by means of which liquid may be returned which is in excess of the amount that may be passed by the dirt arrestor.

Downstream in the direction of conveyance the bearing 5 is combined with a seal consisting first of all of an elastomeric stationary sleeve 17 having a L-shaped cross section and cooperating with a bush 18 stationary mounted on the shaft 1, which bush 18 has been provided with a groove 19 conveying from the left to the right and consequently discharging liquid arriving from the bearing 5 to a chamber 20 which chamber is sealed in the direction of the engine room by an elastomeric sleeve 21 likewise having a L-shaped cross section which cooperates with a smooth bush 22 mounted on the shaft.

The liquid entering the chamber 20 flows through the line 23 to a tank 24.

Sea water is supplied to this tank through the filter 25 and the line 26.

From this tank 24 water is withdrawn by means of the pump 27 supplying the same through the filters 28 for removing fines and the line 29 to the propeller shaft box at 30, that is to say to the space 31 present between the shaft 1 and the box 3. From here the liquid flows in the direction of the arrows 32 and 33 to the bearings 4 and 5, respectively.

With reference to FIG. 2 there is shown a pump housing 34 accommodating therein a pump impeller 35 mounted on a shaft 36. Within a bearing house 37 this shaft is supported by means of two radial bearings 38 and 39 and an axial bearing 40. The radial bearing 38 conveys from the right to the left and receives its lubricating liquid from the chamber 58 by way of the axial bearing 40 and discharges the liquid by way of the elastomeric dirt arrestor 42 conveying in the same direction. The chamber 41 may be supplied with liquid through the opening 43 which liquid may be liquid from the surroundings such as water, or liquid supplied to the opening by means of a line and a pressure pump. This is the so called gland flushing water which in cooperation with the gland 60 will prevent abrasive material present in the suction pump from reaching the dirt arrestor.

The radial bearing 39 conveys from the left to the right and discharges towards a chamber 44 provided with an elastomeric sleeve 45, which sleeve possesses a conveying groove 46 through which liquid leaks away in a controlled manner to the chamber 47 provided with a discharge 48 and a lip shaped elastomeric sleeve 50 cooperating with a smooth bush 49. Lubricating liquid, such as clean water may be supplied, optionally under pressurized conditions to the chamber 58 by way of the channel 59. This may be performed in the same manner as described with reference to FIG. 1.

It is likewise conceivable that the bearing 39 will be conveying from the right to the left and the seal 45, 46 keeps conveying from the left to the right in which case the supply of clean water will then occur by way of the channel 52 indicated in interrupted lines. Between the two radial bearings 38 and 39 there is provided an axial bearing 40 consisting of a disc 53 fixedly mounted on the shaft which disc cooperates with discs 54 and 55 fixedly mounted in the house 37 and having a smooth surface facing the disc 53. At its faces facing the discs 54 and 55 the disc 53 is provided with grooves running from the space 56 and 57, respectively, between the shaft and the house to the annular chamber 58 surrounding the axial bearing. These grooves have flanks which at least in the direction of rotation form a small angle of aperture with the face of the disc and which consequently in cooperation with the surfaces of the elastomeric rings 54 and 55 will form dynamically small lubricating wedges when loaded. These grooves will however also provide for conveyance of the liquid at the same time. This liquid flows from the chamber 58 to the spaces 56 and 57 and then through the bearings 36 and 39 and the dirt arrestor 42 and the metering seal 45, 46, respectively.

If the medium in the pump 34, 35 does not contain abrasive particles and this medium is suitable for lubrication, cooling and flushing of the bearing and the seal the supply of medium by means of an additional flushing pump by way of the inlet 43 as well as the dirt arrestor 43 and the gland 60 may be omitted. The medium of the pump will then serve the several functions and will be discharged in a controlled manner by way of the discharge 48. The supply at 59 may then be omitted. The grooves of the radial bearing 38 and those of the axial bearing cooperating with the disc 54 and 55 will then be designed such that the direction of conveyance is from the left to the right. Optionally a higher throughput may be achieved by utilizing additional channels 61 in the axial bearing.

I claim:

1. A sealed bearing utilizing elastomeric materials such that at the location of the seal the shaft is provided with a helical groove cooperating with a stationary cylindrical elastomeric sleeve having a L-shaped cross section characterized in that the radial bearing is comprised of a stationary elastomeric bush and that at the location of the bearing the shaft is provided with a helical groove the direction of conveyance of which is the same as or opposite to the direction of conveyance of the groove in the shaft at the location of the seal and the propulsive flank of which is at a very small angle with the axis of the shaft and with the tangent to the circumference of the shaft, said bearing being supplied with liquid lubricant.

2. The bearing according to claim 1 characterized in that the supply is by way of the seal.

3. The bearing according to claim 1 characterized in that the discharge is by way of the seal.

4. The bearing according to claim 1, characterized in that the shaft has an axial bearing the stationary bearing parts of which are comprised of elastomeric discs having a smooth surface and of which elastomeric discs the disc mounted on the shaft possesses in its surface grooves running from the inside to the outside or planes of which grooves or at least one flank of which in the direction of rotation is at a small angle of inclination with the plane of the disc, said axial bearing being located in the flow of liquid to or from the radial bearing(s) and seal(s).

5. The bearing according to claim 1 characterized in that the bearing is comprised of two elastomeric radial bearings spaced apart from each other, the directions of conveyance of which are the reverse in combination with axially consecutive elastomeric seals conveying in the same direction and succeeding the bearings in the direction of conveyance and with a supply of pressurized liquid to the shaft box at a location between said radial bearings.

6. The bearing according to claim 5 characterized in that the liquid discharged from at least one seal is returned to the tank from which the bearing liquid is supplied to the shaft box.

7. The bearing according to claim 5 characterized in that between the tank and the shaft box there is provided a pump and a filter for removing fines.

8. The bearing according to claim 1 characterized in that this bearing consists of two elastomeric radial bearings conveying in opposite directions, while between said bearings an axial elastomeric bearing is arranged the elastomeric seals being mounted outwards of the radial bearings and conveying in the same direction as the radial bearings and the supply of liquid occurs at the location of the axial bearing.

* * * * *